(12) United States Patent
Cook et al.

(10) Patent No.: US 8,398,191 B2
(45) Date of Patent: Mar. 19, 2013

(54) CONTINUOUS INKJET PRINTER AQUOUS INK COMPOSITION

(75) Inventors: Wayne L. Cook, Xenia, OH (US); Barbara B. Lussier, Rochester, NY (US); Alexandra D. Bermel, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 491 days.

(21) Appl. No.: 12/624,444

(22) Filed: Nov. 24, 2009

(65) Prior Publication Data
US 2011/0122180 A1    May 26, 2011

(51) Int. Cl.
B41J 2/195    (2006.01)
B41J 2/17    (2006.01)
(52) U.S. Cl. ............................................ 347/7; 347/95
(58) Field of Classification Search .................. 347/6–7, 347/73, 100, 95
See application file for complete search history.

(56) References Cited

U.S. PATENT DOCUMENTS

| | | | |
|---|---|---|---|
| 4,597,794 A | 7/1986 | Ohta et al. | |
| 4,614,948 A * | 9/1986 | Katerberg et al. | 347/89 |
| 4,734,711 A | 3/1988 | Piatt et al. | |
| 4,971,527 A | 11/1990 | Dick | |
| 5,085,698 A | 2/1992 | Ma et al. | |
| 5,172,133 A | 12/1992 | Suga et al. | |
| 5,394,177 A | 2/1995 | McCann et al. | |
| 5,651,813 A | 7/1997 | Santilli et al. | |
| 5,821,283 A | 10/1998 | Hesler et al. | |
| 5,985,017 A | 11/1999 | Bugner et al. | |
| 6,232,369 B1 | 5/2001 | Ma et al. | |
| 6,245,832 B1 | 6/2001 | Suzuki et al. | |
| 6,326,449 B1 | 12/2001 | Haldankar | |
| 6,588,888 B2 | 7/2003 | Jeanmaire et al. | |
| 6,683,121 B2 | 1/2004 | Chiou et al. | |
| 6,943,037 B2 | 9/2005 | Anagnostopoulos et al. | |
| 2004/0171738 A1 | 9/2004 | Harz et al. | |
| 2005/0032930 A1 | 2/2005 | Jackson | |
| 2005/0166794 A1 * | 8/2005 | Bauer | 106/31.37 |
| 2006/0012654 A1 | 1/2006 | Wang et al. | |
| 2006/0071992 A1 | 4/2006 | Sarkisian et al. | |
| 2007/0043144 A1 | 2/2007 | House et al. | |
| 2007/0211125 A1 | 9/2007 | Vasudevan et al. | |
| 2008/0250973 A1 * | 10/2008 | Leenders et al. | 106/31.92 |
| 2009/0054563 A1 | 2/2009 | Jackson | |
| 2009/0169762 A1 | 7/2009 | Szajewski et al. | |
| 2009/0202723 A1 | 8/2009 | Ikoshi et al. | |

FOREIGN PATENT DOCUMENTS

| | | |
|---|---|---|
| EP | 1 416 021 A1 | 5/2004 |
| EP | 1 013 450 B1 | 7/2006 |
| WO | WO 02/078868 A2 | 10/2002 |

* cited by examiner

*Primary Examiner* — Jason Uhlenhake
(74) *Attorney, Agent, or Firm* — Andrew J. Anderson

(57) ABSTRACT

A continuous ink jet printer aqueous ink composition including pigment particles dispersed with a dispersant or self dispersing pigment particles without the need for a dispersant, and a polymer additive distinct from any dispersant used to disperse the pigment particles, wherein the polymer additive comprises a styrene-acrylic copolymer that does not substantially displace any dispersant used to disperse the pigment, present in an amount effective to stabilize the ink composition against shear induced agglomeration caused by pumping the ink composition through a continuous ink jet printing fluid system. A method of continuous ink jet printing includes A) providing a main fluid supply of a continuous inkjet printer with an aqueous ink composition of the invention; B) pumping the ink composition from the main fluid supply to a print head and ejecting a continuous stream of the ink composition from the print head which continuous stream is broken into spaced droplets; and C) in response to electrical signals received from a control mechanism, controlling the spaced droplets to select between printing droplets for marking a substrate and nonprinting droplets that are collected and returned to the main fluid supply.

16 Claims, No Drawings

CONTINUOUS INKJET PRINTER AQUOUS INK COMPOSITION

FIELD OF THE INVENTION

The present invention related to an aqueous inkjet ink composition for continuous inkjet printing application comprising pigment dispersion and a water soluble polymer.

BACKGROUND OF THE INVENTION

Continuous ink jet (CIJ) printers typically consist of two main components, a fluid system and a print head or multiple print heads. Ink is pumped through a supply line from a supply reservoir to a manifold that distributes the ink to a plurality of orifices, typically arranged in linear array(s), under sufficient pressure to cause ink streams to issue from the orifices of the print head. Stimulations are applied to the print head to cause those ink streams to form streams of uniformly sized and spaced droplets, which are deflected into printing or non-printing paths. The non-printing droplets are returned to the supply reservoir via a droplet catcher and a return line. U.S. Pat. Nos. 4,734,711 and 5,394,177 and EP 1,013,450 describe in detail the design of a fluid system for CIJ apparatus. The more recent development of CIJ printing apparatus and print head fabrication can be found in U.S. Pat. No. 6,588,888 and U.S. Pat. No. 6,943,037.

Ink drop uniformity requires maintaining a uniform pressure in the print head cavity. U.S. Pat. No. 4,614,948 describes that a positive displacement pump, such as gear pump, is preferred for use as the ink supply pump. The need to limit pulsation produced by the pump is recognized in U.S. Pat. No. 4,971,527. In addition, filters are employed at appropriate locations in the fluid system to remove oversized particles prior to ink entering into print head orifices and avoid print head clogging.

Commercially available CIJ inks are mostly aqueous dye-based inks, where issues regarding robust system run-ability, such as easy start up/shut down, extended printing time without a crooked jet, and reduced frequency for filter changing have been minimized. In such traditional dye-based inks, no particles are observable under the microscope. Although there have been many recent advances in the art of dye-based ink jet inks, such inks still suffer from deficiencies such as low optical densities on coated glossy paper and poor light-fastness. When water is used as the carrier, such inks also generally suffer from poor water fastness and poor smear resistance.

Pigment-based inks have been proposed as a means of addressing limitations of dye based inks, particularly in drop-on-demand (DOD) inkjet printing systems. In pigment-based inks, the colorant exists as discrete particles. Pigment dispersions known in the art include self-dispersing pigment dispersions, dispersant stabilized pigment dispersions and encapsulated pigment dispersions. For non-self-dispersive pigments, the pigment particles are usually treated with addenda known as dispersants or stabilizers that serve to keep the pigment particles from agglomerating and/or settling out. There has been great progress in recent years in new dispersants/stabilizers for pigment dispersions. Materials are commonly classified into small surfactant molecules or polymers, containing both hydrophilic and hydrophobic segments. Small molecule surfactants disclosed in U.S. Pat. Nos. 5,651,813 and 5,985,017 are found useful due to their compatibility with a wide variety of pigments. Useful polymeric stabilizers include acrylic and styrene-acrylic random or block copolymers, such as those disclosed in U.S. Pat. Nos. 4,597,794, 5,085,698, 5,172,133, 5,821,283, 6,245,832, and 6,326,449. Polymeric dispersants have the additional advantage of offering image durability once the inks are dried on the ink receiver substrate.

However, it has been discovered that severe filter plugging issues may be encountered when running pigment inks in a CIJ fluid system, requiring frequent change of filters, over the time period of a few hours vs. a few months for dye-based inks. The consequence of filter plugging is the loss of fluid pressure and fluid jets, leading to system shutdown. Further investigation has shown that the gear pump commonly used in the fluid system to maintain fluid pressure with minimal pulsation can cause agglomeration of pigment particles, leading to filter clogging and system shutdown. Therefore, there exists a need for pigment ink formulations which are stable in CIJ fluid systems.

It is an object of this invention to provide an aqueous ink jet ink composition for a CIJ printing apparatus containing dispersed pigment, and to allow the ink to be run in a CIJ fluid system for extended periods without significant pressure build up or filter clogging.

SUMMARY OF THE INVENTION

The heretofore need of a pigment ink for CIJ apparatus with extended run-ability can be met by the present invention of a continuous ink jet printer aqueous ink composition comprising pigment particles dispersed with a dispersant or self dispersing pigment particles without the need for a dispersant, and a polymer additive distinct from any dispersant used to disperse the pigment particles, wherein the polymer additive comprises a water soluble copolymer, having block or random segments comprised of styrene and acrylic monomers, where the average molecular weight of the polymer additive is greater than 1000 and the polymer additive is present in an amount effective to stabilize the ink composition against shear induced agglomeration caused by pumping the ink composition through a continuous ink jet printing fluid system.

The invention further provides a method of continuous ink jet printing comprising: A) providing a main fluid supply of a continuous inkjet printer with an aqueous ink composition of the invention; B) pumping the ink composition from the main fluid supply to a print head and ejecting a continuous stream of the ink composition from the print head, said continuous stream is broken into spaced droplets; and C) in response to electrical signals received from a control mechanism, controlling the spaced droplets to select between printing droplets for marking a substrate and nonprinting droplets that are collected and returned to the main fluid supply.

DETAILED DESCRIPTION OF THE INVENTION

The inkjet ink composition of the invention comprises dispersed pigment particles and a polymer additive distinct from any dispersant used to disperse the pigment particles. The additive comprises a water soluble copolymer, having block or random segments comprised of styrene and acrylic monomers, where the average molecular weight of the additive is greater than 1000. The polymer additive is present in the ink composition in an amount effective to stabilize the ink composition against shear induced agglomeration caused by pumping the ink composition through a continuous ink jet printing fluid system.

Pigment-based ink compositions are used because such inks render printed images having higher optical densities and better resistance to light and ozone as compared to printed images made from other types of colorants. A wide variety of organic and inorganic pigments, alone or in combination with additional pigments or dyes, are included in the present invention. Pigments that may be used in the invention include those disclosed in, for example, U.S. Pat. Nos. 5,026,427; 5,085,698; 5,141,556; 5,160,370; and 5,169,436. The exact choice of pigments will depend upon the specific application and performance requirements such as color reproduction and image stability. Dispersed pigment particles are typically present at from 1 to 10 wt % in the continuous inkjet printing inks of the invention, preferably 1 to 6 wt %.

Pigments suitable for use in the invention include, but are not limited to, azo pigments, monoazo pigments, di-azo pigments, azo pigment lakes, β-Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

White pigments, which may be used in ancillary white ink compositions, may be those which are capable of rendering said ink composition white. Any of several white pigments, which are commonly used in this field, may be employed. Employed as such white pigments may be, for example, white inorganic pigments, white organic pigments, and fine white hollow polymer particles. White pigments include inorganic pigments such as sulfates of alkaline earth metals such as barium sulfate, carbonates of alkaline earth metals such as calcium carbonate, silica such as fine silicic acid powder, synthetic silicates, calcium silicate, alumina, alumina hydrates, titanium oxide, zinc oxide, talc, and clay. Specifically, titanium oxide is known as a white pigment which exhibits desired covering properties, coloring (tinting) properties, and desired diameter of dispersed particles. White organic pigments include organic compound salts disclosed in JP-A No. 11-129613, and alkylenebismelamine derivatives disclosed in JP-A Nos. 11-140365 and 2001-234093. Specific commercially available products of the aforesaid white pigments are Shigenox OWP, Shigenox OWPL, Shigenox FWP, Shigenox FWG, Shigenox UL, and Shigenox U (all are commercial product names, by Hakkoru Chemical Co.). Additionally fine white hollow polymer particles such as fine thermoplastic particles comprised substantially of an organic polymer, which are disclosed in U.S. Pat. No. 4,089,800 may be employed.

Pigment-based ink compositions employing non-self-dispersed pigments that are useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink. The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium that is typically the same as or similar to the medium used to dilute the pigment dispersion in step (b). Inert milling medium is optionally present in the milling step (a) in order to facilitate break up of the pigments to primary particles. Inert milling media include such materials as polymeric beads, glasses, ceramics, metals and plastics as described, for example, in U.S. Pat. No. 5,891,231. The milling media described in U.S. Pat. No. 5,679,138 is preferred to obtain pigment dispersion of finer particle size. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, particularly useful dispersants include anionic, cationic or nonionic surfactants such as sodium dodecylsulfate, or potassium or sodium oleylmethyltaurate as described in, for example, U.S. Pat. No. 5,679,138, U.S. Pat. No. 5,651,813 or U.S. Pat. No. 5,985,017, the disclosures of which are incorporated by reference.

Self-dispersing pigments that are dispersible without the use of a dispersant or surfactant can be used in the invention. Pigments of this type are those that have been subjected to a surface treatment such as oxidation/reduction, acid/base treatment, or functionalization through coupling chemistry. The surface treatment can render the surface of the pigment with anionic, cationic or non-ionic groups such that a separate dispersant is not necessary. The preparation and use of covalently functionalized self-dispersed pigments suitable for inkjet printing are reported by Bergemann et al. in U.S. Pat. No. 6,758,891 and U.S. Pat. No. 6,660,075; Belmont in U.S. Pat. No. 5,554,739; Adams and Belmont in U.S. Pat. No. 5,707,432; Johnson and Belmont in U.S. Pat. Nos. 5,803,959 and 5,922,118; Johnson et al. in U.S. Pat. No. 5,837,045; Yu et al. in U.S. Pat. No. 6,494,943; in published applications WO 96/18695, WO 96/18696, WO 96/18689, WO 99/51690, WO 00/05313, and WO 01/51566; Osumi et al. in U.S. Pat. No. 6,280,513 and U.S. Pat. No. 6,506,239; Karl et al. in U.S. Pat. No. 6,503,311; Yeh et al. in U.S. Pat. No. 6,852,156; Ito et al. in U.S. Pat. No. 6,488,753; and Momose et al. in EP 1,479,732 A1. Examples of commercially available self-dispersing type pigments include Cab-O-Jet 200®, Cab-O-Jet-250®, Cab-O-Jet-260, Cab-O-Jet-270®, and Cab-O-Jet 300® (Cabot Specialty Chemicals, Inc.) and Bonjet CW-1® and CW-2® (Orient Chemical Industries, Ltd.).

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic or nonionic polymers; or random, block, branched or graft polymers. Polymeric dispersants useful in the milling operation include random and block copolymers having hydrophilic and hydrophobic portions; see for example, U.S. Pat. No. 4,597,794; U.S. Pat. No. 5,085,698; U.S. Pat. No. 5,519,085; U.S. Pat. Nos. 5,272,201; 5,172,133; U.S. Pat. No. 6,043,297 and WO 2004/111140A1; and graft copolymers; see for example, U.S. Pat. No. 5,231, 131; U.S. Pat. No. 6,087,416; U.S. Pat. No. 5,719,204; or U.S. Pat. No. 5,714,538. Typically, these polymeric resins are copolymers made from hydrophobic and hydrophilic monomers. The copolymers are designed to act as dispersants for the pigment by virtue of the arrangement and proportions of hydrophobic and hydrophilic monomers. The pigment particles are colloidally stabilized by the dispersant and are referred to as a polymer dispersed pigment dispersion. Polymer stabilized pigment dispersions have the additional advantage of offering image durability once the inks are dried down on the ink receiver substrate.

Polymeric dispersants, typically copolymers, are not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Especially useful copolymer dispersants are those where the hydrophobic monomer is selected from benzyl methacrylate or acrylate, or from methacrylic or acrylic acid esters containing an aliphatic chain having twelve or more carbons, which aliphatic chains may be linear or branched. Examples of methacrylic and acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, decyltetradecyl methacrylate, and the like. Preferably the methacrylate or acrylate monomer is stearyl or lauryl methacrylate or acrylate. The hydrophobic portion of the polymer may be prepared from one or more of the hydrophobic monomers.

Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid. Particularly useful polymeric pigment dispersants are further described in US 2006/0012654 and US 2007/0043144, the disclosures of which are incorporated herein by reference.

Typically, the weight average molecular weight of the copolymer dispersant has an upper limit such that it is less than about 50,000 Daltons. Desirably the weight average molecular weight of the copolymer is less than about 25,000 Daltons; more preferably it is less than 15,000 and most preferably less than 10,000 Daltons. The copolymer dispersants preferably have a weight average molecular weight lower limit of greater than about 500 Daltons.

Encapsulating type polymeric dispersants and polymeric dispersed pigments thereof can also be used in the invention. Specific examples are described in U.S. Pat. No. 6,723,785, U.S. Pat. No. 6,852,777, US 2004/0132942, 2005/0020731, 2005/0075416, 2005/0124726, and 2005/0124728, the disclosures of which are incorporated by reference. Encapsulating type polymeric dispersants can be especially useful because of their high dispersion stability on keeping and low degree of interaction with ink components. Composite colorant particles having a colorant phase and a polymer phase are also useful in aqueous pigment-based inks of the invention. Composite colorant particles are formed by polymerizing monomers in the presence of pigments; see for example, US 2003/0199614; US 2003/0203988; or US 2004/0127639. Microencapsulated-type pigment particles are also useful and consist of pigment particles coated with a resin film; see for example U.S. Pat. No. 6,074,467.

The pigment particles useful in the invention may have any particle sizes which can be jetted through a print head. Preferably, the pigment particles have a mean particle size of less than about 0.5 micron, more preferably less than about 0.2 micron, and most preferably less than about 0.1 micron.

In addition to dispersed pigment colorants, the inks of the invention can further contain dyes as supplemental colorants. Dyes suitable for use in the invention include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention include but are not limited to: Acid Yellows, Reactive Yellows, Food Yellows, Acid Reds, Direct Reds, Reactive Reds, Food Reds, Acid Blues, Direct Blues, Reactive Blues, Food Blues, Acid Blacks, Direct Blacks, Reactive Blacks, Food Black, CAS No. 224628-70-0 sold as JPD Magenta EK-1 Liquid from Nippon Kayaku Kabushiki Kaisha; CAS No. 153204-88-7 sold as Intrajet® Magenta KRP from Crompton and Knowles Colors; and the metal azo dyes disclosed in U.S. Pat. Nos. 5,997,622 and 6,001,161. Also useful in the invention as supplemental colorants are polymeric dyes or loaded-dye/latex particles. Examples of polymeric dyes are described in U.S. Pat. No. 6,457,822 and references therein. Examples of loaded-dye/latex particles are described in U.S. Pat. No. 6,431,700; US 2004/0186199; US 2004/0186198; US 2004/0068029; US 2003/0119984; and US 2003/0119938. The supplemental colorants may be present in any effective amount when employed, generally from 0.1 to 10% by weight, and preferably from 0.3 to 5% by weight.

In accordance with this invention, in addition to the pigment dispersion, a water-soluble polymer additive distinct from any dispersant used to disperse the pigment is further employed to increase the stability of the pigment dispersion to shear in a CIJ fluid system. The polymer additive comprises a water soluble copolymer, having block or random segments comprised of styrene and acrylic monomers, where the molecular weight of the additive is greater than 1000. The polymer additive preferably has a weight average molecular weight, Mw, of from about 1,000 to 100,000, more preferably from about 1,000 to about 50,000, and typically from about 1,000 to about 23,000. Such polymer additives may comprise, e.g., one or more polystyrene or substituted polystyrene chains copolymerized with other acrylate or substituted acrylate monomers or attached to another species. In one preferred embodiment, the polymer additive may comprise a copolymer of styrene, alpha-methylstyrene, acrylic acid and trisethylenoxyacrylate.

Examples of preferred types of polymer additives, are shown below. Variations in the architecture are also included in the scope of this invention.

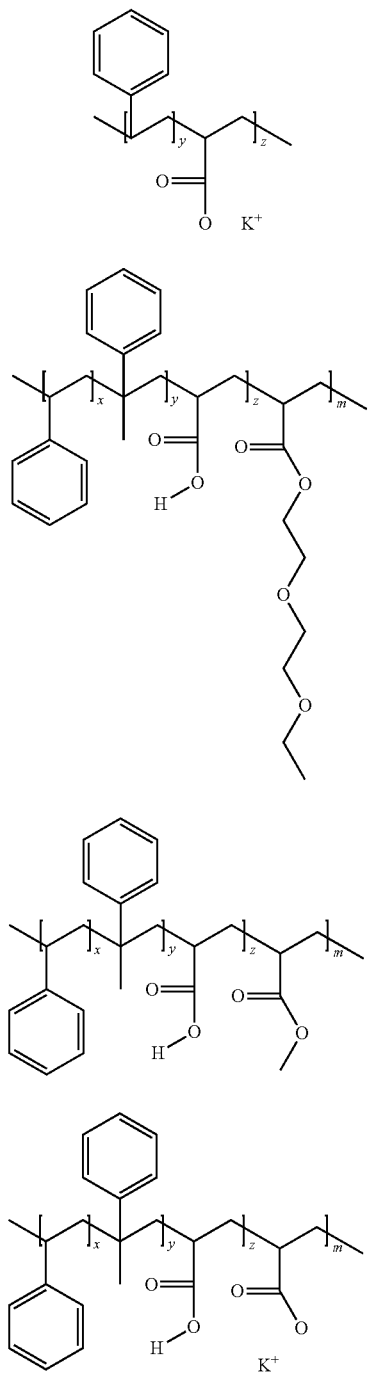

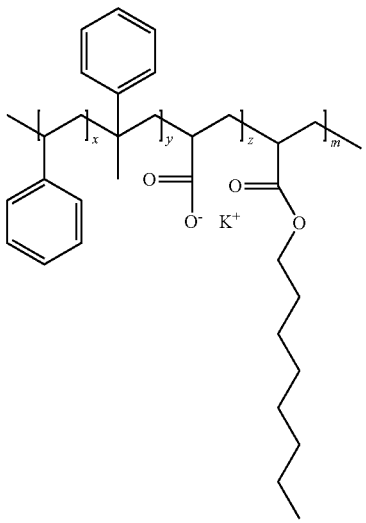

In the above structures (I) to (V), the various subscripts x, y, z, m, independently represent the number of the monomeric styrene and acrylic units in the formula. Preferably, the relative amounts of the various units (and the various subscript numbers) are selected so that the hydrophilic portion in the compound can be wholly or partially neutralized to allow for overall water solubility. In addition, the styrene and acrylic monomer units can have side chains containing alkyl, aryl, ethyleneoxy, propyleneoxy, butyleneoxy and the like, alkylamino, alkylthio, benzyloxy, benzyl, sulfonato, sulfonamido, amido and ureido functionalities.

The polymer additive is present in the ink jet ink compositions of the invention in an amount effective to stabilize the ink composition against shear induced agglomeration caused by pumping the ink composition through a continuous ink jet printing fluid system, but not to substantially displace any dispersant used to disperse the pigment in the ink composition. The concentration of the polymer additive material in the ink is typically from 0.05% to 5% by weight, preferably from 0.1% to 3% by weight, more preferably from 0.3% to 2% by weight, and most preferably from 0.5% to 1% by weight. The styrene-acrylic copolymer additive is preferably present at a weight ratio of from 1:10 to 1:2 relative to the dispersed pigment, more preferably from 1:6 to 1:3, and most preferably from 1:5 to 1:4.

The inkjet ink compositions of the invention are designed specifically for use in a continuous ink jet printer, in which a main fluid supply is provided with the aqueous ink composition, which is then pumped from the main fluid supply to a print head, where a continuous stream of the ink composition is ejected from the print head, which continuous stream then is broken into spaced droplets. In response to electrical signals received from a control mechanism, the droplets are then selected between printing droplets for marking a substrate and nonprinting droplets that are collected and returned to the main fluid supply, as described more fully in the above referenced U.S. Pat. No. 4,734,711, U.S. Pat. No. 5,394,177, EP 1,013,450, U.S. Pat. No. 6,588,888, U.S. Pat. No. 6,943,037, U.S. Pat. No. 4,614,948, and U.S. Pat. No. 4,971,527, the disclosures of which are incorporated by reference herein. In contrast to drop-on-demand printing, CIJ is a very high speed printing process, and it is desired to operate at substrate transport speeds in excess of 200 m/min. Printing speed alone imposes some limitations on ink formulation relative to slower drop-on-demand printing techniques, simply on the basis of the short time requirements for adequately drying the printed substrate moving at full speed in the press before roll wind-up. Surprisingly, features of CIJ printhead operation can allow wider ink formulation latitude than is possible in DOD printing in other respects, however. Ink formulation considerations specific to traditional CIJ printing are described in W. Wnek, *IEEE Trans.* 1986, 1475-81, which elucidates the ink performance requirements for drop formation, deflection and catching of non-printing drops, recirculation of the ink to the printhead from the storage reservoir for future printing, and also for commercial ink-media image quality and durability.

An ink jet ink composition for use in a continuous ink jet printer desirably contains water as the principal vehicle or carrier medium, pigment colorant, humectant, biocide, and surfactant; it can desirably further contain one or more types of other components, including and not limited to a film-forming binder or mordant, a solubilizing agent, a co-solvent, a base, an acid, a pH buffer, a wetting agent, a chelating agent, a corrosion inhibitor, a viscosity modifier, a penetrant, a wetting agent, an antifoamant, a defoamer, an antifungal agent, a jetting aid, a filament length modifier, a trace of multivalent cationic flocculating salt, a solution conductivity control agent, or a compound for suppressing electrostatic deflection charge shorts when ink dries on the charge ribbon electrodes.

Any water-soluble humectant known in the ink-jet art and compatible with the other requirements of the invention can be employed. By water-soluble is meant that a mixture of the employed humectant(s) and water is homogeneous. While an individual humectant can be employed, useful inkjet inks can employ mixtures of two, three or more humectants, each of which imparts a useful property to the inkjet ink. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, dipropyleneglycol, the polyethylene glycols with average molecular weights ranging from 200 to about 5000 Daltons, the polypropylene glycols with average molecular weights ranging from 200 to about 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols and thioglycol; (3) polyoxygenated polyols and their derivatives such as diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives; (4) nitrogen-containing compounds such as urea, 2-pyrrolidone, N-methyl-2-pyrrolidone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone; (5) sulfur-containing compounds such as 2,2'-thiodiethanol, dimethyl sulfoxide and tetramethylene sulfone; and (6) water soluble N-oxides such as 4-methylmorpholine-N-oxides. Of these, glycerol and the polyhydric alcohol derivatives thereof are preferred. The polyhydric alcohol derivatives of glycerol include the glycerol ethoxides, glycerol propoxides and glyceryths. The humectant can be employed alone or in combination with one or more additional listed humectants. The useful humectants have melting points below the typical operating temperature of the intended printer system to avoid the formation of crystalline deposits on the printhead or in the maintenance system. Practically, this means that the useful humectants have melting points below 30° C., preferably below 20° C. and more preferably below 10° C.

While higher levels are typically preferred for use in drop-on-demand printers, the total humectant level of the ink jet ink composition for CIJ printing in accordance with the present invention is desirably 10% or less by weight, more preferably 8% or less by weight, and most preferably 6% or less by weight. A preferred range of humectant is from 0.5 to about 8% by weight, more preferably from 0.5 to about 6% by weight. The total humectant level of the ink is the sum of the individual sources of humectant ingredients, which may include humectant added directly during ink formulation, and for example humectant associated with a commercial biocide preparation as a supplemental ingredient, or with a commercial pigment dispersion preparation that may be present to prevent so-called "paint-flakes" of dried pigment cake forming around a bottle cap, as described in U.S. 2005/0075415 A1 to Harz et al. More desirably, the total humectant level is from about 1% to less than 10%, in order to facilitate drying of the ink jet printing recording material in a high speed printer while simultaneously encouraging higher equilibrium moisture content in dried ink film on hardware for redispersion and clean-up by ink, or by start-up and shut-down fluids, or by a printhead storage fluid.

The pH of the aqueous ink compositions of the invention may be adjusted by the addition of organic or inorganic acids or bases. The pH of the ink jet ink composition directed at CIJ is desirably adjusted from about 7 to about 12; more desirably, the pH is about 8 to 10. When the ink composition is used in hardware with nickel or nickel-plated apparatus components, an anticorrosion inhibitor such as the sodium salt of 4- or 5-methyl-1-H-benzotriazole is desirably added and the pH adjusted to be from about 10 to about 11. When the ink composition is used with printheads with components fabricated from silicon that are in contact with the fluid, the ink composition pH is desirably adjusted to be from about 7 to about 9.5; more desirably, the pH ranges from about 7.5 to about 9. In order to minimize the risk of excessively protonating carboxylate anions associated with polymeric dispersants and anionic charge stabilized anti-abrasion polymers that might render the ink composition more susceptible to flocculation, pH levels lower than about 7 are desirably avoided. With hardware components fabricated from silicon in contact with the ink composition, pH levels higher than about 10 can induce significant rates of etch and corrosion that may impair the operation of the device over time. Typical inorganic acids include nitric, hydrochloric, phosphoric and sulfuric acids. Typical organic acids include methanesulfonic, acetic, formic and lactic acids. Typical inorganic bases include alkali metal hydroxides and carbonates. Typical organic bases include ammonia, triethanolamine and tetramethylethlenediamine. Amine bases especially desirable in the application of the invention to CIJ printing include 3-amino-1-propanol, N,N-dimethanolamine, N,N-dimethylethanolamine, N,N-diethylethanolamine, and triethanolamine. The well known Goods buffers can also be employed.

The inks of the invention may contain surfactants added to adjust the static surface tension or dynamic surface tension of the ink to an appropriate level. The surfactants may be anionic, cationic, amphoteric or nonionic and used at, e.g., levels of 0.01 to 5% of the ink composition. Defoaming agents comprised of phosphate esters, polysiloxanes, or acetylenic diols may further optionally be used with the ink compositions directed at CIJ to minimize foam formation caused the fluid agitation associated with drop catching and ink recirculation.

Inkjet ink compositions may also contain non-colored particles such as inorganic particles or polymeric particles. The use of such particulate addenda has increased over the past several years, especially in inkjet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548 describes the use of a water-dispersible polymer in dye-based inks in order to improve light and ozone resistance of the printed images. For use of such particles to improve gloss differential, light and/or ozone resistance, waterfastness, rub resistance and various other properties of a printed image; see for example, U.S. Pat. No. 6,598,967. Colorless ink compositions that contain non-colored particles and no colorant may also be used. Colorless ink compositions are often used in the art as "fixers" or insolubilizing fluids that are printed under, over, or with colored ink compositions in order to reduce bleed between colors and waterfastness on plain paper; see for example, U.S. Pat. No. 5,866,638 or U.S. Pat. No. 6,450,632. Colorless inks are also used to provide an overcoat to a printed image, usually in order to improve scratch resistance and waterfastness; see for example, US 2003/0005945 or EP 1,022,151A1. Colorless inks are also used to reduce gloss differential in a printed image; see for example, U.S. Pat. No. 6,604,819; US 2003/0085974; US 2003/0193553; or US 2003/0189626.

Examples of inorganic particles useful in the invention include, but are not limited to, alumina, boehmite, clay, calcium carbonate, titanium dioxide, calcined clay, aluminosilicates, silica, or barium sulfate.

The non-colored particles used in the ink compositions may be present in any effective amount, generally from 0.01 to 20% by weight, and preferably from 0.01 to 6% by weight. The exact choice of non-colored particles will depend upon the specific application and performance requirements of the printed image.

A biocide may be added to an inkjet ink composition to suppress the growth of microorganisms such as molds, fungi, etc. in aqueous inks. A preferred biocide for an ink composition is Proxel® GXL (Zeneca Specialties Co.) at a final concentration of 0.0001-0.5 wt. % or Kordek®. Additional additives, which may optionally be present in an inkjet ink composition include thickeners, conductivity enhancing agents, drying agents, waterfastness agents, dye solubilizers, chelating agents, binders, light stabilizers, viscosifiers, buffering agents, anti-mold agents, anti-curl agents, anti-corrosion agents, stabilizers and defoamers.

The exact choice of ink components will depend upon the specific application and performance requirements of the printhead from which they are to be jetted. For current continuous ink ejection mode, acceptable viscosities are no greater than 10 cP, preferably in the range of 1.0 to 5.0 cP.

In the method of continuous ink jet printing in accordance with the invention, a main fluid supply of a continuous inkjet printer is provided with an aqueous ink composition of the invention, and the ink composition is pumped from the main fluid supply to a print head. A continuous stream of the ink composition is ejected from the print head, which continuous stream is broken into spaced droplets. In response to electrical signals received from a control mechanism, the spaced droplets are controlled to select between printing droplets for marking a substrate and nonprinting droplets that are collected and returned to the main fluid supply.

In one embodiment of the invention, the ink jet ink composition for use in a continuous ink jet printer is printed by employing a plurality of drop volumes formed from the continuous fluid stream, with non-printing drops of a different volume than printing drops being diverted by a drop deflection means into a gutter for recirculation, as disclosed in U.S. Pat. Nos. 6,588,888, 6,554,410, 6,682,182, and 6,575,566 to Jeanmaire et al.; US Publication No. 2003/0202054 to Jeanmaire et al.; U.S. Pat. Nos. 6,793,328; 6,866,370 to D. Jeanmaire; and U.S. Pat. No. 6,517,197 to Hawkins et al., the disclosures of which are herein incorporated in their entirety by reference. In another preferred embodiment, the ink jet ink composition is printed using an apparatus capable of controlling the direction of the formed printing and non-printing drops by asymmetric application of heat to the fluid stream that initializes drop break-up and serves to steer the resultant drop, as disclosed in U.S. Pat. Nos. 6,079,821 and 6,505,921 to Chwalek et al., the disclosures of which are herein incorporated in their entirety by reference. Useful ink agitation, heated ink supply and printhead and fluid filtration means for CIJ pigmented ink jet ink compositions are described in U.S. Pat. No. 6,817,705 to Crockett et al. Printer replenishing systems for maintaining ink quality and countering the effects of ink volatile component evaporation are described in U.S. Pat. Nos. 5,526,026 to M. Bowers and 5,473,350 to Mader et al., and EP 0 597 628 A1 to Loyd et al.

The following examples illustrate the utility of the present invention.

EXAMPLES

Yellow Pigment Dispersion YD-1

To a 10-gallon, 13-inch diameter and 17-inch deep, double-walled stainless steel mixing vessel containing four baffles was added 2,560 g water and 2,400 g of a 15% solution of potassium hydroxide-neutralized dispersant terpolymer, prepared from benzyl methacrylate, stearyl methacrylate, and methacrylic acid at the feed ratio of 37:30:33 by weight, and having an average molecular weight Mw of 8,700 (polymer P-1). A nominal 6-inch, ring-style disperser impeller (Hockmeyer Equipment Corp. D-Blade) driven by a Hockmeyer Model HBI-7.5-11-99 High Shear Mixer was centered 3 inches above the bottom of the mixing vessel, and stirring was initiated. Pigment Yellow 74 (Sun Chemical) (1,200 g) was slowly added to the fluid. Milling media comprising beads of polystyrene resin (copolymer of styrene and divinylbenzene/ethylvinylbenzene mixture) with an average particle diameter of 50 micrometers (7,200 g) was added slowly while increasing impeller speed. The mixture was milled with an impeller blade tip speed of ca. 20 meter/second for about 20 hours at an internal temperature of 25-30° C. The dispersion/media mixture was further diluted with water (5,940 g) and biocide Kordek™ MLX (Rohm and Haas Co.) (60 g) to a final pigment concentration of about 10% and polymer P-1 about 3%. The impeller was removed and the milling media filtered off. A final filtration through a 0.3-micrometer Pall Corp. Profile depth filter yielded roughly 10.6 kg of dispersion. The dispersion had a median particle size of 80 nanometers (Intensity mode) as characterized by Nanotrac Auto Sampler NAS35 (Nanotrac Inc., Nanotrac Brand).

Yellow Pigment Dispersion YD-2

Yellow pigment dispersion 2 (YD-2) was prepared in a similar manner to Yellow dispersion YD-1, except the dispersant feed ratio of benzylmethacrylate, stearyl methacrylate and methacrylic acid was 50:30:20 (Polymer P-2) and the added pigment was a 1:1 mixture of Pigment Yellow 74 and Pigment Yellow 155.

Cyan Pigment Dispersion CD-1

The cyan pigment dispersion was prepared in a similar manner to the yellow dispersion (YD-1) with the exception that the pigment used was Sunfast Pigment Blue 15:3 from Sun Chemical and the dispersing polymer was a 15% solution of DMEA-neutralized dispersant terpolymer (P-1-A), prepared from benzyl methacrylate, stearyl methacrylate, and methacrylic acid at the feed ratio of 37:30:33 by weight, and having an average molecular weight Mw of 8,700. The dispersion/media mixture was diluted with water (5,940 g) and biocide Kordek™ MLX (Rohm and Haas Co.) (60 g) to a final pigment concentration of about 10% and polymer P-1-A about 4.2%. The dispersion had a median particle size of 55 nanometers (Intensity mode) as characterized by Nanotrac Auto Sampler NAS35 (Nanotrac Inc., Nanotrac Brand).

Cyan Pigment Dispersion CD-2

The cyan pigment dispersion R4169 was obtained from Degussa and contained Pigment Blue 15 at 20% concentration (by weight).

Cyan Pigment Dispersion CD-4

The cyan pigment dispersion was prepared in a similar manner to the yellow dispersion (YD-1) with the exception that the pigment used was Sunfast Pigment Blue 15 (Sun Chemical) and the dispersing agent was KOMT.

Example 1

High Shear Stability Test-A

When pigment inks are destabilized by recirculation through a gear pump, the average pigment particle size increases. The increase may be small, and may be difficult to detect using commercially available particle size measurement instrumentation, but it can be readily detected and quantified through simple measurements of the transmission of near infrared radiation through the ink.

When a collimated beam of radiation traverses a suspension of particles, some of the radiation is scattered and the intensity of the beam is reduced. The process is analogous to that of light absorption, and the coefficient that describes it is generally denoted as turbidity $\tau$:

$$\tau = \frac{1}{l}\log\left(\frac{I_0}{I}\right)$$

or $$\tau = \frac{OD}{l}\log(10)$$

where OD denotes optical density, which is the quantity actually measured, and l is the optical pathlength of the suspension. The magnitude of the turbidity depends on the optical properties of the suspension and of the concentration of particles in it. But, for particles that are smaller than or similar in size to the radiation wavelength, it depends strongly on their size. Turbidimetry, a simple and inherently precise technique, can thus be used to provide a measure of an average particle size that is very sensitive to small changes in that average.

In designing a turbidimeter suitable for monitoring ink pigment particle size, primary consideration was given to the selection of the radiation wavelength. For ease of data interpretation the wavelength needed to be long compared to the particle size, but not so long that the measured optical density (which varies with wavelength to the inverse $3^{rd}$ power) was unmeasurably small. It was also important to select a wavelength that was not absorbed by the pigment. In our work we made use of collimated diode laser modules as radiation sources. Studies of yellow and magenta inks made use of 830 nm lasers; studies of cyan inks made use of a 965 nm lasers. Each laser was installed in a compact turbidimetric instrument that was also fitted with an optical cell to contain the ink, and a silicon photodiode light detector to measure the transmitted light intensity. The turbidimeter was interfaced to a computer capable of recording this intensity and converting it to optical density.

The path length of the cell was selected according to the pigment concentration to give optical densities in the range 0.1 to 1. This is the range that can be measured with optimum precision. In our work we used flow cells with pathlengths in the range 1 mm to 5 mm. At the selected wavelengths and pathlengths, our inks could be measured without the need for dilution.

A system was designed to be capable of in-line monitoring of gear pump induced destabilization of inks. This system comprised a small reservoir to contain the ink sample, a gear pump, and a turbidimeter, all connected in a recirculation loop. The volume of ink required to fill the system was minimized in order to maximize the destabilization effect for a given pump at a given flow rate. The loop made use of tubing with a 1/16" internal diameter. The reservoir volume was 20 mL. The total system volume was 30 mL. The gear pumps used were Micropump Model 180s. The recirculation flow rate was 150 ml/minute.

Before pumping ink through the flow cell, it was filled with water so that a baseline reading of the transmitted light intensity could be obtained by the computer. The system was then filled with ink and the pump was turned on. The computer then continuously monitored the optical density, displayed it as a chart of optical density vs. time, and saved these data in a file.

It was typical for the optical density to increase linearly with time. This linear behavior often extended over long time periods and over large increases in the measured optical density. The initial slope of the trace (normally obtained by fitting a straight line through the data collected over the first 2 hours and expressed in milliabsorbance units per hour) was used as the relative measure of the ink's gear pump stability. The most stable inks had slopes that were not distinguishable from zero. The least stable inks had slopes as high as 30 mAU/hour.

Ink Preparation

Inks were prepared according to the formulas listed in Table 1 (percents are weight percents). In addition, each contained glycerol at 5%, Surfynol® 440 (available from Air Products) at 0.02%, Cobratec TT-50S (available from PMC Specialties) at 0.1% and Proxel GXL (available from Arch Chemical) at 0.1% by weight. All components employed, except for the pigments, were water soluble at the quantities used.

Water soluble materials used in the inks in Table-1 are:

P-1: the polymer dispersant used for pigment dispersions YD-1. It is a terpolymer of benzyl methacrylate, stearyl methacrylate, and methacrylic acid at the feed ratio of 37:30:33 by weight, and having an average molecular weight Mw of 8,700. Potassium Hydroxide was used to neutralize 90% of the acid.

P-2: the polymer dispersant used for pigment dispersions YD-2. It is a terpolymer of benzyl methacrylate, stearyl methacrylate, and methacrylic acid at the feed ratio of 50:30:20 by weight, and having an average molecular weight Mw of 7,700. Potassium Hydroxide was used to neutralize 90% of the acid.

P-3: a copolymer similar to P-1 with a feed ratio of 36:30:34 having an average Mw of 18000. The final polymer was 100% neutralized with dimethylethanolamine.

P-4: a copolymer similar to P-3 with a feed ratio of 30:30:40 having an average Mw of 8000.

P-5: a copolymer similar to P-4 having an average Mw of 19000.

P-6: a copolymer similar to P-3 with a feed ratio of 45:15:40 having an average Mw of 8000.

P-7: a copolymer similar to P-6 having an average Mw of 15000.

P-8: Joncryl HPD696 available from BASF, a styrene acrylic copolymer having a Mw of 16,000. Acid groups 90% neutralized with KOH.

TABLE 1

| Ink ID | Final Ink Pigment concentration (Dispersion) | Additive | MW of additive | Rate of OD increase (mAU/Hour) |
|---|---|---|---|---|
| YI-1 (comparison) | 4% (YD-2) | None | | 30.1 |
| YI-2 (comparison) | 4% (YD-2) | P-1 - 0.80% | 9000 | 19.3 |
| YI-3 (comparison) | 4% (YD-2) | P-2 - 0.80% | 7700 | 20.0 |
| YI-4 (comparison) | 4% (YD-2) | P-3 - 0.80% | 18000 | 19.7 |
| YI-5 (comparison) | 4% (YD-2) | P-4 - 0.80% | 8000 | 21.8 |
| YI-6 (comparison) | 4% (YD-2) | P-5 - 0.80% | 19000 | 22.6 |
| YI-7 (comparison) | 4% (YD-2) | P-6 - 0.80% | 8000 | 17.5 |
| YI-8 (comparison) | 4% (YD-2) | P-7 - 0.80% | 15000 | 17.3 |
| YI-9 (Invention) | 4% (YD-2) | P-8 - 0.80% | 16000 | 3.0 |

As shown in Table 1, yellow pigment dispersion YD-2 had very poor stability against high shear force in gear pump in yellow ink YI-1 with no additive. Addition of polymers P-1 through P-7 as additives in comparison yellow inks YI-2 through YI-8, respectively, only improved stability slightly, as indicated by lower rate of OD increase. Yellow ink YI-9, employing an additive in accordance with the present invention, however, significantly improved the dispersion stability against high shear, and thus the rate of OD increase was almost not detectable.

Example 2

High Shear Stability Test-B

Gear Pump Recirculation/Filtration Ratio Test

A 300 mL sample of each ink was continuously circulated through a Micropump gear pump at a flow rate of 1000 mL/min, and a pressure of 30 psi. The inks were recirculated, without filtration for 20 hours, then submitted to the Filtration Ratio Test.

Filtration Ratio Test

A vacuum filtration apparatus, comprised of a 200 mL funnel fitted with a 3.0 μm membrane filter (25 mm, acrylic copolymer) and a 4 L vacuum flask connected to a vacuum pump was used for all ink filtrations. The vacuum was maintained at 3 inches Hg. The time required for 1000 mL of DI water, of a measured temperature, to pass through the filter was recorded. A sample of the test ink (200 mL) at 25° C. was similarly filtered and the time required for filtration recorded. The following equation was used to determine the filtration ratio for the ink. Inks not fully filtered after 3 min. were considered to have failed the test.

$$FR_{corrected} = \frac{DI \text{ Water Time (sec)} \times \text{Ink Sample Viscosity@} 25° \text{ C.} \times 200 \text{ mL}}{\text{Ink Sample Time (sec)} \times DI \text{ water Viscosity } (cPs) \times 1000 \text{ mL}}$$

Ink Preparation

Inks were prepared according to the formulas listed in Table 2 (percents are weight percents). In addition, each contained glycerol at 5%, Surfynol® 440 (available from Air Products) at 0.02%, Cobratec TT-50S (available from PMC Specialties) at 0.1%, Surfynol DF 110L (Air Products) at 0.2% and Proxel GXL (available from Arch Chemical) at 0.1% by weight. All components employed, except for the pigments, were water soluble at the quantities used.

Water soluble materials used in the inks in Table-2 are:

P-8: Joncryl HPD696 available from BASF, a styrene acrylic copolymer having a Mw of 16,000. Acid groups 90% neutralized with KOH.

P-9 Joncryl HPD93 available from BASF, a styrene acrylic copolymer having a Mw of 16000, 100% neutralized with NaOH.

P-10 a copolymer similar to P-1 with an average Mw of 16,000.

P-11 a copolymer similar to P-1 with an average Mw of 12,000.

P-12 a copolymer similar to P-2 with an average Mw of 13000.

P-13: A copolymer of benzyl methacrylate, and methacrylic acid at the feed ratio of 72:28 by weight, and having an average molecular weight Mw of 8,700. Potassium Hydroxide was used to neutralize 90% of the acid.

P-14: A copolymer similar to P-13 with a feed ratio of 67:33

P-15: A copolymer similar to P-13 with a feed ratio of 62:37

P-16: A random copolymer of styrene, alpha methylstyrene, acrylic acid and tris-ethylenoxyacrylate, and having an average molecular weight Mw of 8,000. Potassium Hydroxide was used to neutralize 90% of the acid.

P-17: A random copolymer of styrene, alpha methylstyrene, acrylic acid and tris-ethylenoxyacrylate, and having an average molecular weight Mw of 12,000 Potassium Hydroxide was used to neutralize 90% of the acid.

TABLE 2

| Ink ID | Final Ink Pigment concentration (Dispersion) | Additive | MW of additive | Filtration Ratio after 20 hours Gear pump recirculation |
|---|---|---|---|---|
| YI-10 (comparison) | 3% YD-1 | P-10 at 0.6% | 16000 | Failed |
| YI-11 (comparison) | 3% YD-1 | P-11 at 0.6% | 12000 | 0.28 |
| YI-12 (comparison) | 3% YD-1 | P-12 at 0.6% | 13000 | Failed |
| YI-13 (comparison) | 3% YD-1 | P-13 at 0.6% | 8700 | 0.48 |
| YI-14 | 3% YD-1 | P-14 at 0.6% | 8700 | 0.38 |

TABLE 2-continued

| Ink ID | Final Ink Pigment concentration (Dispersion) | Additive | MW of additive | Filtration Ratio after 20 hours Gear pump recirculation |
|---|---|---|---|---|
| YI-15 (comparison) | 3% YD-1 | P-15 at 0.6% | 8700 | Failed |
| YI-16 (comparison) | 3% YD-1 | none | — | Failed |
| YI-17 (invention) | 3% YD-1 | P-8 at 0.6% | 16000 | 1.27 |
| YI-18 (invention) | 3% YD-1 | P-9 at 0.6% | 18000 | 1.07 |
| YI-19 (invention) | 3% YD-1 | P-16 at 0.6% | 8000 | 1.01 |
| YI-20 (invention) | 3% YD-1 | P-17 at 0.6% | 12000 | 0.98 |

As shown in Table 2, inks without additional additives or with noninventive polymeric additives (YI-10-YI-16) were badly agglomerated and either would not pass through the filter or filtered very slowly after 20 hours gear pump recirculation. Inks YI-17-YI-20 of this invention significantly improved the dispersion stability against high shear and prevented agglomeration allowing the inks to filter at a significantly higher rate.

Example 3

High Shear Stability Test-B

Gear Pump Recirculation/Filtration Ratio Test as described above.

Cyan Ink Preparation

Inks were prepared according to the formulas listed in Table 3 (percents are weight percents). In addition, each contained glycerol at 3%, Surfynol DF110L (available from Air Products) at 0.01% by weight, Cobratec TT-50S (available from PMC Specialties) at 0.05% and Proxel GXL (available from Arch Chemical) at 0.1% by weight. All components employed, except for the pigments, were water soluble at the quantities used.

Water soluble materials used in the inks in Table-3 are:

P-8: Joncryl HPD696 available from BASF, a styrene acrylic copolymer having a Mw of 16,000. Acid groups 90% neutralized with KOH.

P-18 Joncryl HPD696 available from BASF, a styrene acrylic copolymer having a Mw of 16,000. Acid groups 100% neutralized with DMEA.

P-19 a Joncryl HPD96 available from BASF, a styrene acrylic copolymer having a Mw of 16,000. Acid groups 100% neutralized with NH4OH.

TABLE 3

| Ink ID | Final Ink Pigment concentration (Dispersion CD-1) | Additive | Neutralizing Group | Filtration Ratio after 20 hours Gear pump recirculation |
|---|---|---|---|---|
| CI-1 (comparison) | 4% | None | | Failed |
| CI-2 (invention) | 4% | P-8 at 0.39% | KOH | 0.84 |
| CI-3 (invention) | 4% | P-8 at 0.78% | KOH | 0.96 |
| CI-4 (invention) | 4% | P-8 at 1.18% | KOH | 1.28 |
| CI-5 (invention) | 4% | P-18 at 0.5% | DMEA | 0.74 |
| CI-6 (invention) | 4% | P-18 at 1.0% | DMEA | 0.98 |
| CI-7 (invention) | 4% | P-18 at 1.5% | NH4OH | 0.99 |
| CI-8 (invention) | 4% | P-19 at 1.5% | 16000 | 1.45 |

As shown in Table 3, the comparison ink (CI-1) without additional additives was badly agglomerated and either would not pass through the filter or filtered very slowly after 20 hours gear pump recirculation. Inks CI-1-CI-8 of this invention significantly improved the dispersion stability against high shear and prevented agglomeration allowing the inks to filter at a significantly higher rate. Increased levels of the invention polymer resulted in improved filtration ratios (Inks CI-2-4 and CI-5-7).

Example 4

High Shear Stability Test 3

An apparatus for continuous recirculation/filtration of inks, utilizing a Micropump gear pump, was equipped with a Pall 1.2 micron capsule filter, a flow rate monitor and a pressure gauge monitor. Changes in flow rate and pressure were recorded to determine the degree of agglomeration of pigment Cyan Ink Preparation Inks were prepared as described below. All components employed, except for the pigments, were water soluble at the quantities used. Water soluble materials used in the inks in Table-4 are:

P-8: Joncryl HPD696 (available from BASF), a styrene acrylic copolymer having a Mw of 16,000. Acid groups 90% neutralized with KOH.

P-20 Joncryl HPD296 (available from BASF), a styrene acrylic copolymer having a Mw of 11500, and an approximate AN=140.

CI-9—An ink was prepared by mixing CD-2 (Degussa R4169 dispersion, Pigment Blue 15, 20%) BYK defoamer, Dynol 604 surfactant, and P-20. (P:B ratio=2.4:1) Water was added to give a final ink concentration of 6% pigment.

CI-10—An ink was prepared by mixing CD-2 (Degussa R4169 dispersion, Pigment Blue 15, 20%) BYK defoamer, Dynol 604 Surfactant and P-1 (P:B ratio=2.4:1). Water was added to give a final ink concentration of 6% pigment.

CI-11—An ink was prepared by mixing Cyan dispersion CD-3, Surfynol DF 110-L defoamer (Air Products) and P-8 (P:B ratio 4:1). Water was added to give a final ink concentration of 6% pigment.

CI-12—An ink was prepared by mixing Cyan dispersion CD-3, Surfynol DF 110-L defoamer (Air Products) and P-1 (P:B ratio 4:1). Water was added to give a final ink concentration of 6% pigment.

TABLE 4

| Ink | Recirculation Time (hrs) | Flow Rate (mL/min) | Prefilter Pressure (psi) |
|---|---|---|---|
| CI-9 (invention) | 264 | 356 | 4.5 |
| CI-10 (comparison) | 70 | 0 | 60 |
| CI-11 (invention) | 250 | 307 | 7.2 |
| CI-12 (comparison) | 48 | 10 | 44 |

The invention has been described in detail with particular reference to certain preferred embodiments thereof, but it will be understood that variations and modifications can be effected within the spirit and scope of the invention.

The invention claimed is:

1. A continuous ink jet printer aqueous ink composition comprising pigment particles dispersed with a dispersant or self dispersing pigment particles without the need for a dispersant, from 0.5 to 8% by weight of humectant, and a polymer additive distinct from any dispersant used to disperse the pigment particles, wherein the polymer additive comprises a water soluble copolymer, having block or random segments comprised of styrene and acrylic monomers, where the average molecular weight of the polymer additive is greater than 1000 and the polymer additive is present in an amount effective to stabilize the ink composition against shear induced agglomeration caused by pumping the ink composition through a continuous ink jet printing fluid system wherein the dispersed pigment particles are present at from 1 to 10 wt %, the styrene-acrylic copolymer is present at from 0.1 to 3 wt %, and the polymer additive is present at a weight ratio of from 1:10 to 1:3 relative to the dispersed pigment.

2. A continuous ink jet printer aqueous ink composition according to claim 1, wherein the dispersed pigment particles are present at from 1 to 6 wt %.

3. A continuous ink jet printer aqueous ink composition according to claim 2, wherein the polymer additive is present at a weight ratio of from 1:6 to 1:3 relative to the dispersed pigment.

4. A continuous ink jet printer aqueous ink composition according to claim 2, wherein the polymer additive is present at a weight ratio of from 1:5 to 1:4 relative to the dispersed pigment.

5. A continuous ink jet printer aqueous ink composition according to claim 1, wherein the polymer additive is present at from 0.3 to 2 wt %.

6. A continuous ink jet printer aqueous ink composition according to claim 1, wherein the polymer additive is present at from 0.5 to 1 wt %.

7. A continuous ink jet printer aqueous ink composition according to claim 1, wherein the polymer additive has a weight average molecular weight (Mw) of from 1000 to 50000.

8. A continuous ink jet printer aqueous ink composition according to claim 1, wherein the pigment is dispersed with a dispersant.

9. A continuous ink jet printer aqueous ink composition according to claim 8, wherein the pigment comprises a cyan, a magenta, or a yellow colored pigment.

10. A continuous ink jet printer aqueous ink composition according to claim 8, wherein the pigment comprises a yellow colored pigment.

11. A continuous ink jet printer aqueous ink composition according to claim 8, wherein the dispersant is a polymeric dispersant.

12. A continuous ink jet printer aqueous ink composition according to claim 8, wherein the dispersant is a non-polymeric dispersant.

13. A continuous ink jet printer aqueous ink composition according to claim 1, comprising 6 or less percent by weight of humectant.

14. A method of continuous ink jet printing comprising:
   A) providing a main fluid supply of a continuous inkjet printer with an aqueous ink composition according to claim 1;
   B) pumping the ink composition from the main fluid supply to a print head and ejecting a continuous stream of the ink composition from the print head which continuous stream is broken into spaced droplets; and
   C) in response to electrical signals received from a control mechanism, controlling the spaced droplets to select between printing droplets for marking a substrate and nonprinting droplets that are collected and returned to the main fluid supply.

15. A method of continuous ink jet printing according to claim 14, wherein the ink composition is pumped from the main fluid supply to the print head through a positive displacement pump.

16. A method of continuous ink jet printing according to claim 15, wherein the positive displacement pump is a gear pump.

* * * * *